US011673569B2

(12) United States Patent
Yamamoto

(10) Patent No.: US 11,673,569 B2
(45) Date of Patent: Jun. 13, 2023

(54) ALERT CONTROL APPARATUS AND ALERT CONTROL METHOD

(71) Applicant: DENSO CORPORATION, Kariya (JP)

(72) Inventor: Norio Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 17/137,168

(22) Filed: Dec. 29, 2020

(65) Prior Publication Data
US 2021/0114613 A1 Apr. 22, 2021

Related U.S. Application Data

(63) Continuation of application No. 16/072,289, filed as application No. PCT/JP2016/081200 on Oct. 21, 2016, now Pat. No. 10,906,555.

(51) Int. Cl.
*B60W 50/14* (2020.01)
*B60W 30/10* (2006.01)
(Continued)

(52) U.S. Cl.
CPC ............ *B60W 50/14* (2013.01); *B60W 30/10* (2013.01); *B62D 1/28* (2013.01); *B62D 15/0255* (2013.01);
(Continued)

(58) Field of Classification Search
CPC ......... B60W 2050/0095; B60W 50/14; B60W 30/10; B60W 2540/00; B60W 50/00; B60W 50/08; B60W 50/082; B60W 2050/14; B60W 2050/143; B60W 40/08; B60W 40/00; B60W 40/0818; B60W 40/0827; B60W 40/0836; B60W 40/0845; B60W 40/0854; B60W 40/0872; B60L 2250/00; G08G 1/0962; G08G 1/00; G08G 1/09;
(Continued)

(56) References Cited

U.S. PATENT DOCUMENTS 8,509,982 B2 8/2013 Montemerlo et al.
8,676,430 B1 3/2014 Ferguson et al.
(Continued)

FOREIGN PATENT DOCUMENTS

JP 2003-170760 A 6/2003
JP 2008-039501 A 2/2008
(Continued)

*Primary Examiner* — Anthony R Jimenez
(74) *Attorney, Agent, or Firm* — Maschoff Brennan

(57) ABSTRACT

An alert control apparatus that notifies a driver in advance of a transfer of control relating to a driving operation from an automatic driving function to the driver by controlling an alert device mounted on a vehicle, which is equipped with the automatic driving function, includes: an estimator that estimates an occurrence of a change execution situation that requires a lane change under a condition in which the driving operation of the vehicle is controlled by the automatic driving function; a determiner that determines a level of difficulty of lane change control based on a plurality of travel environment factors in the change execution situation; and a notification device that notifies the driver of a possibility of the transfer of the control together with a reason of the transfer of the control with a notification mode corresponding to the level using the alert device.

4 Claims, 6 Drawing Sheets

(51) Int. Cl.
    *B62D 15/02*     (2006.01)
    *B62D 1/28*     (2006.01)
    *G08G 1/0962*     (2006.01)
    *G05D 1/00*     (2006.01)
    *B60W 50/00*     (2006.01)

(52) U.S. Cl.
    CPC ......... *G05D 1/0061* (2013.01); *G05D 1/0088* (2013.01); *G08G 1/0962* (2013.01); *B60W 2050/0095* (2013.01)

(58) Field of Classification Search
    CPC ............... G05D 1/0061; G05D 1/0088; G05D 2201/02; G05D 2201/0213; G05D 1/00; B62D 15/0255; B62D 1/28; B62D 15/00; B62D 15/02; B60K 28/00; B60K 28/06; B60K 28/066
    USPC .......................................................... 701/24
    See application file for complete search history.

(56) References Cited

U.S. PATENT DOCUMENTS

| | | | |
|---|---|---|---|
| 9,235,211 | B2 | 1/2016 | Davidsson et al. |
| 11,250,514 | B2* | 2/2022 | Kumar ................... G06Q 40/08 |
| 2003/0109980 | A1 | 6/2003 | Kojima et al. |
| 2005/0004743 | A1 | 1/2005 | Kojima et al. |
| 2017/0232974 | A1 | 8/2017 | Nishida |
| 2019/0155279 | A1* | 5/2019 | Tayama ................ B60W 50/14 |

FOREIGN PATENT DOCUMENTS

| | | |
|---|---|---|
| JP | 2009-115717 A | 5/2009 |
| JP | 2013-544695 A | 12/2013 |
| JP | 2015-175825 A | 10/2015 |
| JP | 2015-179037 A | 10/2015 |
| JP | 2016-095831 A | 5/2016 |

\* cited by examiner

ALERT CONTROL APPARATUS AND ALERT CONTROL METHOD

CROSS REFERENCE TO RELATED APPLICATION

This application is continuation application of U.S. application Ser. No. 16/072,289, filed on Jul. 24, 2018, which is a national stage application of PCT Application No. PCT/JP2016/081200, filed on Oct. 21, 2016, which claims priority to Japanese Patent Application No. 2016-12760 filed on Jan. 26, 2016, the disclosure of which is incorporated herein by reference.

TECHNICAL FIELD

The present disclosure relates to an alert control apparatus that, in a vehicle equipped with an automatic driving function, notifies a driver in advance of a transfer of control relating to a driving operation from the automatic driving function to the driver and an alert control method.

BACKGROUND ART

Conventionally, even in a system capable of performing a driving operation on behalf of a driver such as an automatic driving support apparatus disclosed in Patent Literature 1, a condition in which it is difficult to continue automatic driving is unavoidably caused by a reduction in the reliability of information that identifies an own vehicle position. Thus, in the automatic driving support apparatus in Patent Literature 1, the degree of continuability of automatic driving is indexed to determine high or low of a possibility that continuation of automatic driving immediately becomes impossible. The driver is notified in advance of the high or low of the possibility of a transfer of control with an alert mode corresponding to the determination result. Accordingly, the driver can receive the control from the automatic driving support apparatus after recognizing the high or low of the possibility that continuation of automatic driving immediately becomes impossible.

However, in the automatic driving support apparatus in Patent Literature 1, the notification of the possibility that automatic driving cannot be continued is performed on the basis of a reduction in the reliability of each sensor that identifies the own vehicle position. Thus, it is difficult to ensure sufficient time from the performance of the notification to the start of the control transfer. In addition, since only the high or low of the possibility of the transfer is notified, the driver receives the control with no understanding of the state of a situation in which the control is transferred. As a result, the driver is likely to feel troublesomeness such that the driver is forced to change driving under the initiative of a system of the automatic driving support apparatus.

PRIOR ART LITERATURES

Patent Literature

Patent Literature 1: JP-2015-179037-A

SUMMARY

It is an object of the present disclosure to provide an alert control apparatus and an alert control method that notifies a driver in advance of a transfer of control so as not to give the driver a troublesome feeling such that the driver is forced to change driving under the initiative of a system.

According to a first aspect of the present disclosure, an alert control apparatus that notifies a driver in advance of a transfer of control relating to a driving operation from an automatic driving function to the driver by controlling at least one alert device mounted on a vehicle, which is equipped with the automatic driving function for performing the driving operation on behalf of the driver, the alert control apparatus includes: an estimator that estimates an occurrence of a change execution situation that requires a lane change under a condition in which the driving operation of the vehicle is controlled by the automatic driving function; a determiner that determines a level of difficulty of lane change control based on a plurality of travel environment factors in the change execution situation estimated by the estimator; and a notification device that notifies the driver of a possibility of the transfer of the control together with a reason of the transfer of the control with a notification mode corresponding to the level determined by the determiner using the at least one alert device.

In the alert control apparatus described above, when the occurrence of a change execution situation that requires a lane change is estimated, the driver is notified in advance of both of the possibility of a transfer of control relating to a driving operation and the reason of the control transfer. Such an advance notification based on the situation estimation makes it possible to ensure sufficient time from the performance of the notification to the start of the transfer.

In addition, the reason of the control transfer is notified with a notification mode corresponding to the level of difficulty of lane change control. Accordingly, the driver can initiatively receive the control relating to the driving operation after previously understanding the state of the change execution situation that requires a lane change and making advance preparations. Thus, it is possible to reduce a troublesome feeling of the driver such that the driver is forced to change driving under the initiative of a system relating to the automatic driving function.

According to a second aspect of the present disclosure, an alert control method for notifying a driver in advance of a transfer of control relating to a driving operation from an automatic driving function to the driver by controlling at least one alert device mounted on a vehicle, which is equipped with the automatic driving function for performing the driving operation on behalf of the driver, the alert control method executed by at least one processor, includes: estimating an occurrence of a change execution situation that requires a lane change under a condition in which the driving operation of the vehicle is controlled by the automatic driving function; determining a level of difficulty of lane change control based on a plurality of travel environment factors in an estimated change execution situation; and notifying the driver of a possibility of the transfer of the control together with a reason of the transfer of the control with a notification mode corresponding to a determined level using the at least one alert device.

In the alert control method described above, when the occurrence of a change execution situation that requires a lane change is estimated, the driver is notified in advance of both of the possibility of a transfer of control relating to a driving operation and the reason of the control transfer. Such an advance notification based on the situation estimation makes it possible to ensure sufficient time from the performance of the notification to the start of the transfer.

In addition, the reason of the control transfer is notified with a notification mode corresponding to the level of difficulty of lane change control. Accordingly, the driver can initiatively receive the control relating to the driving operation after previously understanding the state of the change execution situation that requires a lane change and making advance preparations. Thus, it is possible to reduce a troublesome feeling of the driver such that the driver is forced to change driving under the initiative of a system relating to the automatic driving function.

BRIEF DESCRIPTION OF DRAWINGS

The above and other objects, features and advantages of the present disclosure will become more apparent from the following detailed description made with reference to the accompanying drawings. In the drawings.

EMBODIMENTS

Hereinbelow, a plurality of embodiments of the present disclosure will be described with reference to the drawings. Corresponding elements between the respective embodiments may be denoted by the same reference signs to avoid repetitive description. In each of the embodiments, when only a part of a configuration is described, a configuration of the other preceding embodiments can be applied to the other part of the configuration. Further, in addition to a combination of configurations clearly stated in each of the embodiments, configurations of a plurality of embodiments may be partially combined even if not clearly stated unless there is an obstacle in the combination.

First Embodiment

Figure 1:
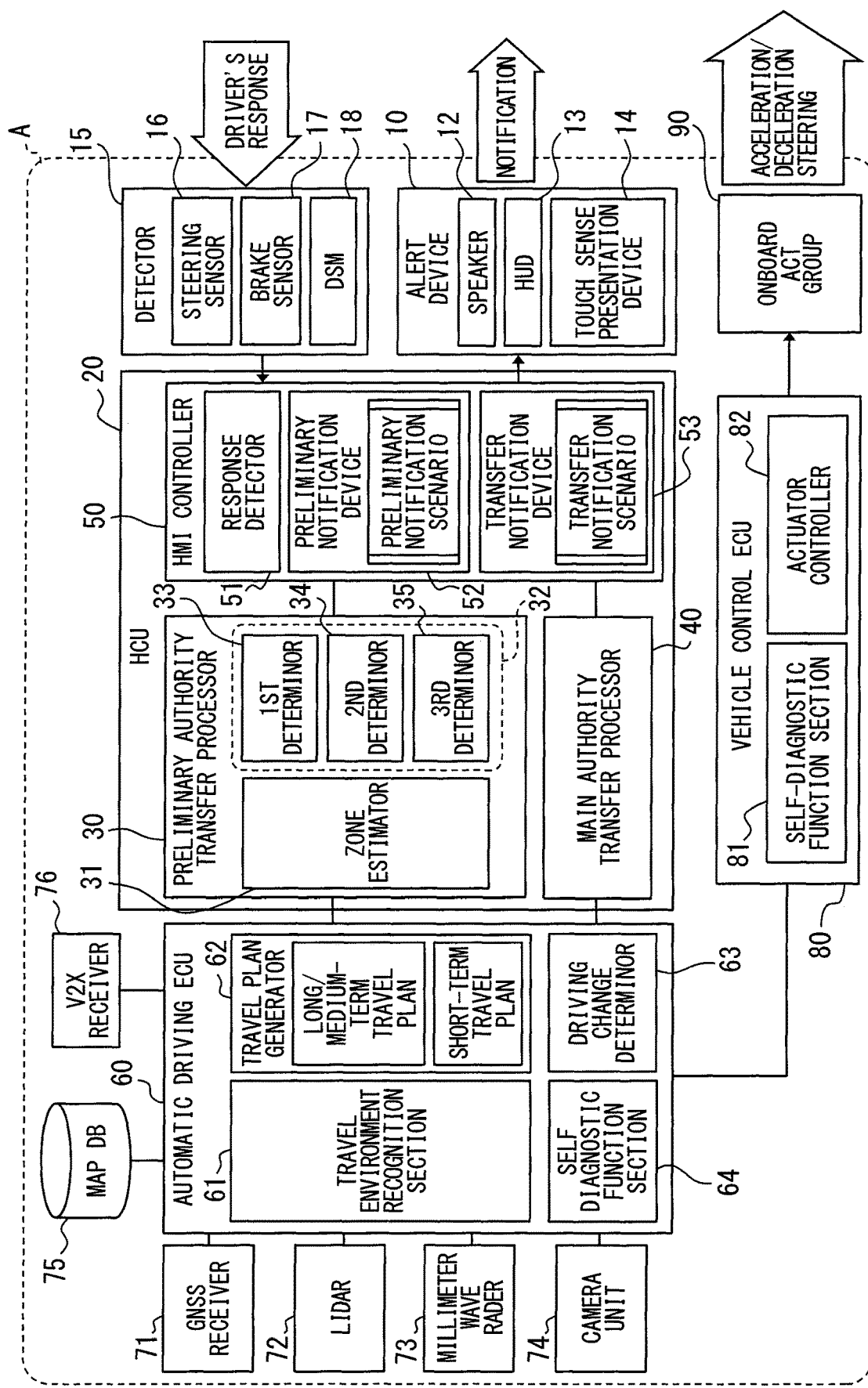
FIG. 1 is a block diagram illustrating the entire configuration of an HCU, an automatic driving ECU, a vehicle control ECU, and the like in a first embodiment.
Figure 2:
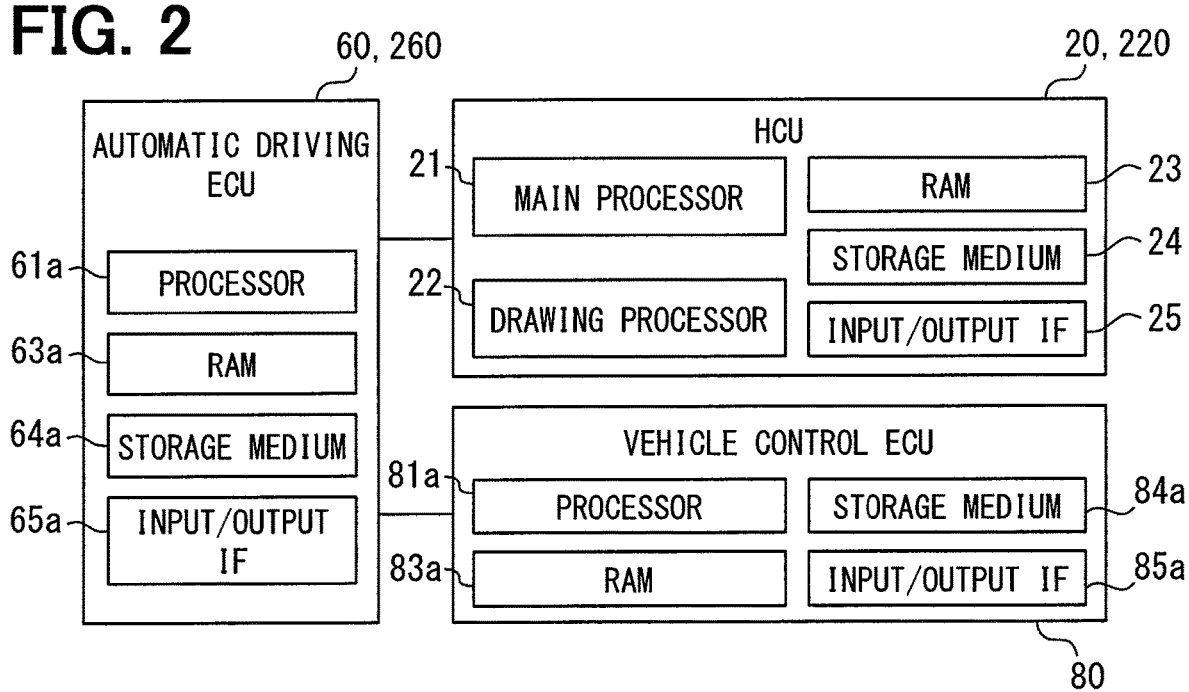
FIG. 2 is a diagram illustrating an example of a specific configuration of the HCU, the automatic driving ECU, and the vehicle control ECU.

A human machine interface (HMI) control unit (HCU) 20 according to a first embodiment of the present disclosure illustrated in FIGS. 1 and 2 is mounted on a vehicle A equipped with an automatic driving function. An automatic driving ECU 60 and a vehicle control ECU 80 are mounted, as an electronic control unit for implementing the automatic driving function, on the vehicle A. The HCU 20 is electrically connected to a plurality of alert devices 10 which notifies a driver of information and a plurality of detectors 15 which detects a state of the driver in addition to the automatic driving ECU 60.

The automatic driving ECU 60 exhibits the automatic driving function capable of performing a driving operation on behalf of the driver of the vehicle A by performing acceleration and deceleration control and steering control for the vehicle A in cooperation with the vehicle control ECU 80. The automatic driving ECU 60 is mainly composed of a microcomputer which includes a processor 61a, a RAM 63a, a storage medium 64a, and an input/output interface 65a. The automatic driving ECU 60 is electrically connected to a GNSS receiver 71, a lidar 72, a millimeter wave radar 73, a camera unit 74, a map database 75, a V2X receiver 76, and the like. The automatic driving ECU 60 acquires information required for automatic driving from these elements (71 to 76).

The global navigation satellite system (GNSS) receiver 71 receives positioning signals from a plurality of artificial satellites. The GNSS receiver 71 measures the current position of the vehicle A on the basis of the received positioning signals. The GNSS receiver 71 successively outputs the measured positional information of the vehicle A to the automatic driving ECU 60.

The lidar 72, the millimeter wave radar 73, and the camera unit 74 are autonomous sensors each of which detects moving objects such as a pedestrian and another vehicle and also stationary objects such as a fallen object on a road, a traffic light, a guard rail, a curb, a road sign, a road marking, and a lane marking. Each of the lidar 72, the millimeter wave radar 73, and the camera unit 74 successively outputs detected object information relating to detected moving and stationary objects to the automatic driving ECU 60.

The lidar 72 emits a laser beam in a traveling direction of the vehicle A and receives the laser beam reflected by a moving object or a stationary object present in the traveling direction to acquire detected object information. The millimeter wave radar 73 emits a millimeter wave in the traveling direction of the vehicle A and receives the millimeter wave reflected by a moving object or a stationary object present in the traveling direction to acquire detected object information. The millimeter wave radar 73 is capable of detecting a more distant object than the lidar 72 is.

The camera unit 74 includes a monocular or compound-eye front camera which captures an image of a front region in front of the vehicle A and an image processor which analyzes the front region image captured by the front camera. The camera unit 74 extracts a moving object or a stationary object included in the front region image to acquire detected object information.

The map database 75 is a storage medium that stores many map data items therein. The map data includes structure information such as the curvature, the gradient, and the length of a section of each road, and nontemporary traffic regulation information such as a speed limit and one-way traffic. The map database 75 causes the automatic driving ECU 60 to acquire map data around the current position of the vehicle A and in the traveling direction of the vehicle A.

The V2X receiver 76 exchanges information with an onboard communication device which is mounted on another vehicle and a roadside device which is installed on the road side by wireless communication. The V2X receiver 76 receives temporary traffic regulation information, congestion information, and weather information by vehicle-to-vehicle communication with the onboard communication device and road-to-vehicle communication with the roadside device and successively outputs the received information items to the automatic driving ECU 60. The temporary traffic regulation information includes, for example, information of lane regulation and closed road which occur on a road in the traveling direction of the vehicle A due to an accident or a construction work. The congestion information includes, for example, information of the degree of traffic congestion and the condition of traffic flow (e.g., a traveling speed) on a road in the traveling direction. The weather information includes, for example, information of the amount of rainfall, the amount of snowfall, and the occurrence of fog on a road in the traveling direction.

The automatic driving ECU 60 constructs a self-diagnostic function section 64, a travel environment recognition section 61, a travel plan generator 62, and a driving change determiner 63 as functional blocks relating to automatic driving by executing an automatic driving program stored in the storage medium 64a by the processor 61a. The self-diagnostic function section 64 diagnoses whether each function of the automatic driving ECU 60 is in normal operation.

The travel environment recognition section 61 recognizes a travel environment of the vehicle A by combining positional information acquired from the GNSS receiver 71, detected object information acquired from each of the autonomous sensors, and map data acquired from the map database 75 with each other. Specifically, the travel environment recognition section 61 recognizes the shape and a moving state of an object around the vehicle A within a detection range of each of the autonomous sensors mainly on the basis of the detected object information and generates a virtual space that reproduces an actual travel environment. In addition, the travel environment recognition section 61 recognizes a travel environment outside the detection range of each of the autonomous sensors using each information acquired from the map data and the V2X receiver 76.

The travel plan generator 62 generates a travel plan for causing the vehicle A to automatically travel by the automatic driving function on the basis of the travel environment recognized by the travel environment recognition section 61. The travel plan includes a long and medium-term travel plan and a short-term travel plan. The travel plans formulated by the travel plan generator 62 are successively output from the automatic driving ECU 60 to the HCU 20 and the vehicle control ECU 80 together with operating information which indicates whether automatic driving is active.

The long and medium-term travel plan defines a route to a destination for the vehicle A. The route defined by the long and medium-term travel plan extends to a position outside the detection range of each of the autonomous sensors. The long and medium-term travel plan reflects structure information and nontemporary traffic regulation information included in the map data and temporary traffic regulation information received from the outside. As a result, in the route defined by the long and medium-term travel plan, not only a direction that should be followed by the vehicle A at a branch point, but also a lane that is suitable for smooth passage at a lane regulation area and a branch point is selected.

The short-term travel plan defines a scheduled travel track for achieving travel following the long and medium-term travel plan using the virtual space around the vehicle A generated by the travel environment recognition section 61. In the short-term travel plane, specifically, the execution of steering for a lane change, acceleration and deceleration for speed control, and quick braking for avoiding collision is determined.

The driving change determiner 63 determines whether it is possible to continue a driving operation by the automatic driving function. The driving change determiner 63 determines that it is difficult or impossible to continue the driving operation by the automatic driving function when it is difficult to generate a short-term travel plan based on the recognized travel environment. In addition, the driving change determiner 63 determines that it is difficult or impossible to continue the driving operation by the automatic driving function when a failure in a system has been detected on the basis of each of diagnosis results by the self-diagnostic function section 64 of the automatic driving ECU 60 and a self-diagnostic function section 82 of the vehicle control ECU 80 (described below). The driving change determiner 63 starts a driving change from the automatic driving function to the driver by outputting a transfer execution signal for executing a transfer of control relating to a driving operation to the HCU 20 and the vehicle control ECU 80.

The vehicle control ECU 80 is electrically connected to an onboard actuator group 90 which is mounted on the vehicle A and integrally controls acceleration and deceleration and steering of the vehicle A. The vehicle control ECU 80 is mainly composed of a microcomputer which includes a processor 81a, a RAM 83a, a storage medium 84a, and an input/output interface 85a. The onboard actuator group 90 includes, for example, a throttle actuator, an injector, a brake actuator, a motor generator for driving, and a steering actuator.

The vehicle control ECU 80 constructs an actuator controller 81 and the self-diagnostic function section 82 as functional blocks relating to vehicle control by executing a vehicle control program stored in the storage medium 84a by the processor 81a. The actuator controller 81 generates a control signal having contents following the scheduled travel track formulated by the travel plan generator 62 in a state in which the automatic driving function is active and outputs the generated control signal to the onboard actuator group 90. In addition, the actuator controller 81 generates a control signal having contents following a driving operation input by the driver in a state in which the automatic driving function is inactive, for example, when a transfer execution signal has been acquired and outputs the generated control signal to the onboard actuator group 90. The self-diagnostic function section 82 diagnoses whether each function of the vehicle control ECU 80 is in normally operation.

Each of the alert devices 10 notifies occupants of the vehicle A including the driver of various pieces of information relating to the vehicle A on the basis of alert control information output by the HCU 20. The alert device 10 may be previously mounted on the vehicle A, or carried into a vehicle cabin by an occupant of the vehicle A so as to be temporarily mounted on the vehicle A. The alert devices 10 include a speaker 12, a head-up display (HUD) device 13, and a touch sense presentation device 14.

The speaker 12 gives the driver or the like an alert through the sense of hearing by reproducing an alert sound or a message voice inside the vehicle cabin. The HUD device 13 gives the driver an alert through the sense of sight by forming a virtual image in front of the driver. The touch sense presentation device 14 is, for example, a vibration device which is disposed on a steering wheel or a footrest which is capable of changing a posture. The touch sense presentation device 14 gives the driver an alert through the sense of touch.

Each of the detectors 15 detects driver information relating to a driving state of the driver and successively outputs the detected driver information to the HCU 20. The detectors 15 include a steering sensor 16, a brake sensor 17, and a driver status monitor (DSM) 18.

The steering sensor 16 is a sensor that detects a grasp on the steering wheel or a sensor that detects an input of a steering torque to the steering wheel. The steering sensor 16 detects, as driver information, whether a steering operation by the driver is possible. The brake sensor 17 is, for example, a sensor that detects a placement of the foot of the driver on a brake pedal. The brake sensor detects, as driver information, whether a brake operation by the driver is possible.

The DSM 18 includes a near-infrared light source, a near-infrared camera, and a control unit which controls the near-infrared light source and the near-infrared camera. The DSM 18 captures an image of the face of the driver with near-infrared light applied by the near-infrared light source using the near-infrared camera. The DSM 18 extracts, for example, the direction of the face of the driver and an opening state of the eyes of the driver from the captured image to detect, as driver information, looking-aside and a reduction in an awakening level in the driver.

The HCU 20 is an electronic control unit that integrally controls acquisition of operating information input by the driver and information presentation to the driver. The HCU 20 is an electronic control unit mainly composed of a microcomputer which includes a main processor 21, a drawing processor 22, a RAM 23, a storage medium 24, and an input/output interface 25. The HCU 20 constructs a preliminary authority transfer processor 30, a main authority transfer processor 40, and an HMI controller 50 as functional blocks by executing an alert control program stored in the storage medium 24 by each of the processors 21, 22.

The preliminary authority transfer processor 30 is a functional block that performs a process of notifying the driver in advance of a transfer of the control from the automatic driving function to the driver before the start of the transfer (hereinbelow, referred to as a "preliminary authority transfer"). The preliminary authority transfer is performed before determination of a driving change by the driving change determiner 63 so as to be started prior to a start timing of an actual transfer by a previously set grace period (e.g., approximately 30 seconds). Thus, in the preliminary authority transfer, the driver is notified of not determination of the transfer of the control, but a possibility of the transfer of the control. In addition, the driver is also notified of a reason why it has been determined that there is a possibility of the transfer of the control. In the preliminary authority transfer processor 30, a zone estimator 31 and a determiner group 32 including at least a plurality of (three) determiners 33 to 35 are constructed as sub-functional blocks relating to the preliminary authority transfer.

The zone estimator 31 determines whether the driving operation of the vehicle A is being controlled by the automatic driving function on the basis of operating information output from the automatic driving ECU 60. The zone estimator 31 estimates the occurrence of a change execution situation that requires a lane change (hereinbelow, referred to as an "LC scheduled zone") on the basis of the long and medium-term travel plan formulated by the travel plan generator 62 under a condition in which the automatic driving function is active.

Specifically, when a merging point is present in the traveling direction of the vehicle A, that is, on a route formulated by the travel plan generator 62, the zone estimator 31 estimates the occurrence of the LC scheduled zone. The merging point is set at a point that merges into a main through lane relating to an interchange (IC), a junction (JCT), and a service area (SA) and a parking area (PA) on the route on the basis of the map data. In addition, the zone estimator 31 estimates the occurrence of the LC scheduled zone also when there is a lane regulation on the route on the basis of temporary traffic regulation information acquired by the V2X receiver 76.

The determiner group 32 estimates the level of difficulty of lane change control (hereinbelow, referred to as an "LC level") on the basis of a plurality of travel environment factors in the LC scheduled zone estimated by the zone estimator 31. Each of the determiners 33 to 35 determines whether to raise the LC level on the basis of the travel environment factors which differ from each other. Accordingly, the determiner group 32 is capable of classifying the possibility of a driving change into a plurality of stages, specifically, four stages of LC levels 0 to 3. As the LC level becomes higher, the degree of difficulty of lane change control becomes higher.

The first determiner 33 is capable of acquiring structure information of a road in the LC scheduled zone as one of the travel environment factors. The first determiner 33 may acquire structure information output from the map database 75 to the automatic driving ECU 60 from the automatic driving ECU 60 or may extract structure information reflected in the long and medium-term travel plan. The first determiner 33 determines an LC level resulting from the road structure as a first driving change possibility using the acquired structure information. For example, when an acceleration lane for merging into the main through lane has a rising gradient and the acceleration lane is shorter than a predetermined distance, the first determiner 33 affirms the first driving change possibility and raises the LC level by one. On the other hand, when the acceleration lane is horizontal and has a standard distance, the first determiner 33 denies the first driving change possibility and maintains the LC level.

The second determiner 34 acquires congestion information of a road in the LC scheduled zone as one of the travel environment factors. The second determiner 34 is capable of acquiring congestion information output from the V2X receiver 76 to the automatic driving ECU 60 from the automatic driving ECU 60. The second determiner 34 determines an LC level resulting from the degree of traffic congestion as a second driving change possibility using the acquired congestion information. For example, when traffic flow (traveling speed) in an acceleration lane or a main through lane which merges with the acceleration lane is bad, the second determiner 34 affirms the second driving change possibility and raises the LC level by one. On the other hand, when traffic flow in the LC scheduled zone is smooth, the second determiner 34 denies the second driving change possibility and maintains the LC level.

The third determiner 35 acquires weather information in the LC schedule zone as one of the travel environment factors. The third determiner 35 is capable of acquiring weather information output from the V2X receiver 76 to the automatic driving ECU 60 from the automatic driving ECU 60. The third determiner 35 determines an LC level resulting from a weather factor as a third driving change possibility using the acquired weather information. For example, when there is rainfall or snowfall or there is fog in an area including the LC scheduled zone, the third determiner 35 affirms the third driving change possibility and raises the LC level by one. On the other hand, when a weather condition is good in the LC scheduled zone, the third determiner 35 denies the third driving change possibility and maintains the LC level.

The main authority transfer processor 40 is a functional block that performs a process of notifying the driver of execution of a transfer of control (hereinbelow, referred to as a "main authority transfer") when the control is transferred from the automatic driving function to the driver. When the main authority transfer processor 40 acquires a transfer execution signal based on the determination by the driving change determiner 63 from the automatic driving ECU 60, the main authority transfer processor 40 causes the HMI controller 50 to generate alert control information for performing the main authority transfer.

The HMI controller 50 is a functional block that performs a process relating to acquisition of driver information detected by the detector 15 and a process relating to information presentation to the driver using the alert device 10. In the HMI controller 50, a response detector 51, a preliminary notification device 52, and a transfer notification device 53 are constructed as sub-functional blocks relating to the preliminary authority transfer and the main authority transfer.

The response detector 51 detects a response from the driver to the preliminary authority transfer from driver information detected by each of the detectors 15. The response detector 51 determines whether the driver has grasped the steering wheel, the driver is in a state capable of operating the brake pedal, and the driver directs his/her sight to the front by the preliminary authority transfer.

The preliminary notification device 52 performs a preliminary authority transfer which notifies the driver in advance of the possibility of a transfer of the control together with a reason of the transfer using at least one of the plurality of alert devices 10. The preliminary notification device 52 can perform the preliminary authority transfer with a notification mode corresponding to the level of difficulty of lane change control. Specifically, the preliminary notification device 52 acquires a determination result by the determiner group 32 from the preliminary authority transfer processor 30 and selects a preliminary notification scenario corresponding to the acquired determination result. In the preliminary notification scenario, all travel environment factors that raise the LC level are included in a message to the driver as a reason of the transfer of the control among the travel environment factors used in the determination of the LC level, such as the structure information, the congestion information, and the weather information.

In addition, the preliminary notification device 52 selects a preliminary notification scenario that uses more alert devices 10 in the preliminary authority transfer as the LC level becomes higher. For example, when the LC level is "1", the preliminary authority transfer is performed by virtual display by the HUD device 13. When the LC level is "2", the preliminary authority transfer is performed by utterance by the speaker 12 and virtual display by the HUD device 13. When the LC level is "3", the preliminary authority transfer is performed using all of utterance by the speaker 12, virtual display by the HUD device 13, and touch sense presentation by the touch sense presentation device 14. The preliminary notification device 52 generates alert control information based on the selected preliminary notification scenario and outputs the generated alert control information to the alert device 10.

The transfer notification device 53 selects a transfer notification scenario for a main authority transfer on the basis of a command from the main authority transfer processor 40. The transfer notification device 53 selects an optimal transfer notification scenario so that a driving change from the automatic driving function to the driver is smoothly performed by the main authority transfer. The transfer notification device 53 generates alert control information based on the selected transfer notification scenario and outputs the generated alert control information to the alert device 10.

Figure 3:
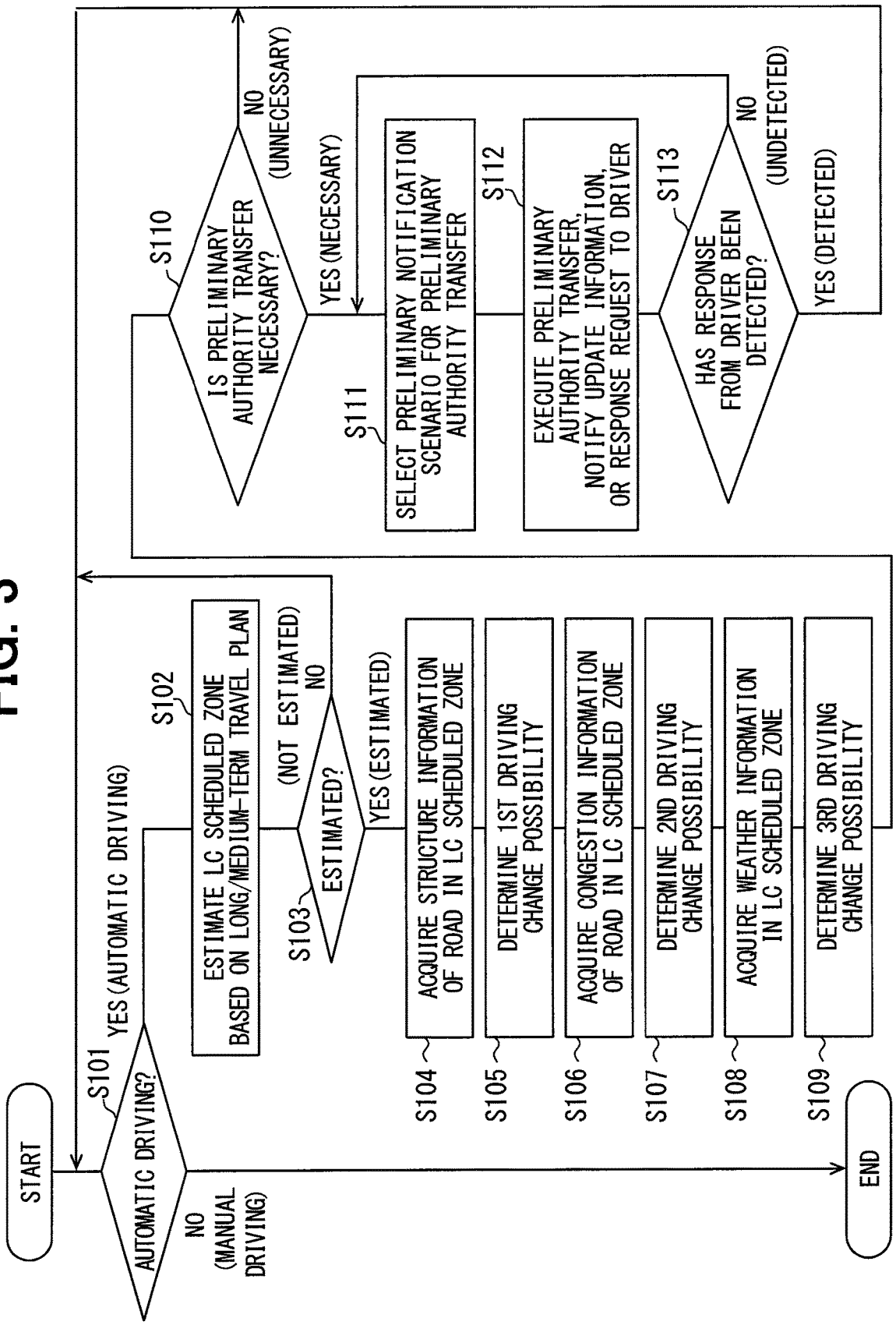
FIG. 3 is a flowchart illustrating details of an advance notification process performed by the HUC.

Details of the advance notification process for achieving the preliminary authority transfer described above will be described with reference to FIG. 3 and also to FIG. 1. The advance notification process illustrated in FIG. 3 is started by the HCU 20 when an ignition of the vehicle A is turned on. The advance notification process is repeatedly started by the HCU 20 until the ignition of the vehicle A is turned off.

In S101, an operating state of the automatic driving function is determined. When it is determined in S101 that the driving operation of the vehicle A is being controlled by the automatic driving function, the process proceeds to S102. On the other hand, when a driving state is a manual driving state in which the driver performs the driving operation and it is determined in S101 that the automatic driving function is inactive, the advance notification process is temporarily finished.

The occurrence of an LC scheduled zone is estimated on the basis of a long and medium-term travel plan in S102, and the process proceeds to S103. In S103, it is determined whether the occurrence of the LC scheduled zone has been estimated in S102. When the occurrence of the LC scheduled zone has not been estimated in S102, the process returns to S101. On the other hand, when the occurrence of the LC scheduled zone has been estimated in S102, the process proceeds to S104.

Structure information of a road in the LC scheduled zone estimated in S102 is acquired in S104, and the process proceeds to S105. The first driving change possibility is determined in S105 on the basis of the structure information acquired in S104, and the process proceeds to S106. When the structure information acquired in S104 indicates a rising gradient or a short distance of an acceleration lane in the LC scheduled zone, the first driving change possibility is affirmed, and the LC level is raised by one in S105.

Congestion information of the road in the LC scheduled zone estimated in S102 is acquired in S106, and the process proceeds to S107. The second driving change possibility is determined in S107 on the basis of the congestion information acquired in S106, and the process proceeds to S108. When the congestion information acquired in S106 indicates a bad traffic flow condition in the LC scheduled zone, the second driving change possibility is affirmed, and the LC level is raised by one in S107.

Weather information in the LC scheduled zone estimated in S102 is acquired in S108, and the process proceeds to S109. The third driving change possibility is determined in S109 on the basis of the weather information acquired in S108, and the process proceeds to S110. When the weather information acquired in S108 indicates a bad weather condition in the LC scheduled zone, the third driving change possibility is affirmed, and the LC level is raised by one in S109.

In S110, it is determined whether the preliminary authority transfer is necessary on the basis of each of determination results in S105, S107, and S109. When all of the first to third driving change possibilities are denied, and the LC level is zero, the preliminary authority transfer is determined to be unnecessary in S110, and the process returns to S101. In this case, for example, a message that includes no transfer reason such as "PLEASE PAY ATTENTION TO YOUR SURROUNDINGS" may be displayed or uttered by the control of the alert device 10.

On the other hand, when at least one of the first to third driving change possibilities is affirmed, the preliminary authority transfer is determined to be necessary in S110, and the process proceeds to S111. In S111, a preliminary notification scenario for the preliminary authority transfer is selected on the basis of the LC level according to the determination results in S105, S107, and S109, and the process proceeds to S112.

In S112 performed for the first time based on the affirmative determination in S110, a preliminary authority transfer based on the preliminary notification scenario selected in S111 is executed, and the process proceeds to S113. In S113, it is determined whether a response from the driver to the preliminary authority transfer executed in S112 has been detected. When it is determined in S113 that the response from the driver has been detected, the process returns to S101. On the other hand, when it is determined in S113 that no response from the driver has been detected, S111 and S112 are executed again. When the LC level in the determination by each of the determiners 33 to 35 is low (e.g., a level 1), the process of determining the presence or absence of a response from the driver may be omitted by skipping S113.

In S111 and S112 performed for the second and subsequent times based on the negative determination in S113, update information such as a lifting of the lane regulation, a deterioration or recovery of the weather condition, and a recovery of the traffic flow is presented to the driver. In addition, in S112 performed for the second and subsequent times, for example, a message such as "PLEASE PREPARE FOR DRIVING CHANGE" is displayed or uttered as a response request to the driver. When the driver takes no appropriate driving state in response to the message, the alert by the preliminary authority transfer is repeated.

Figure 4:
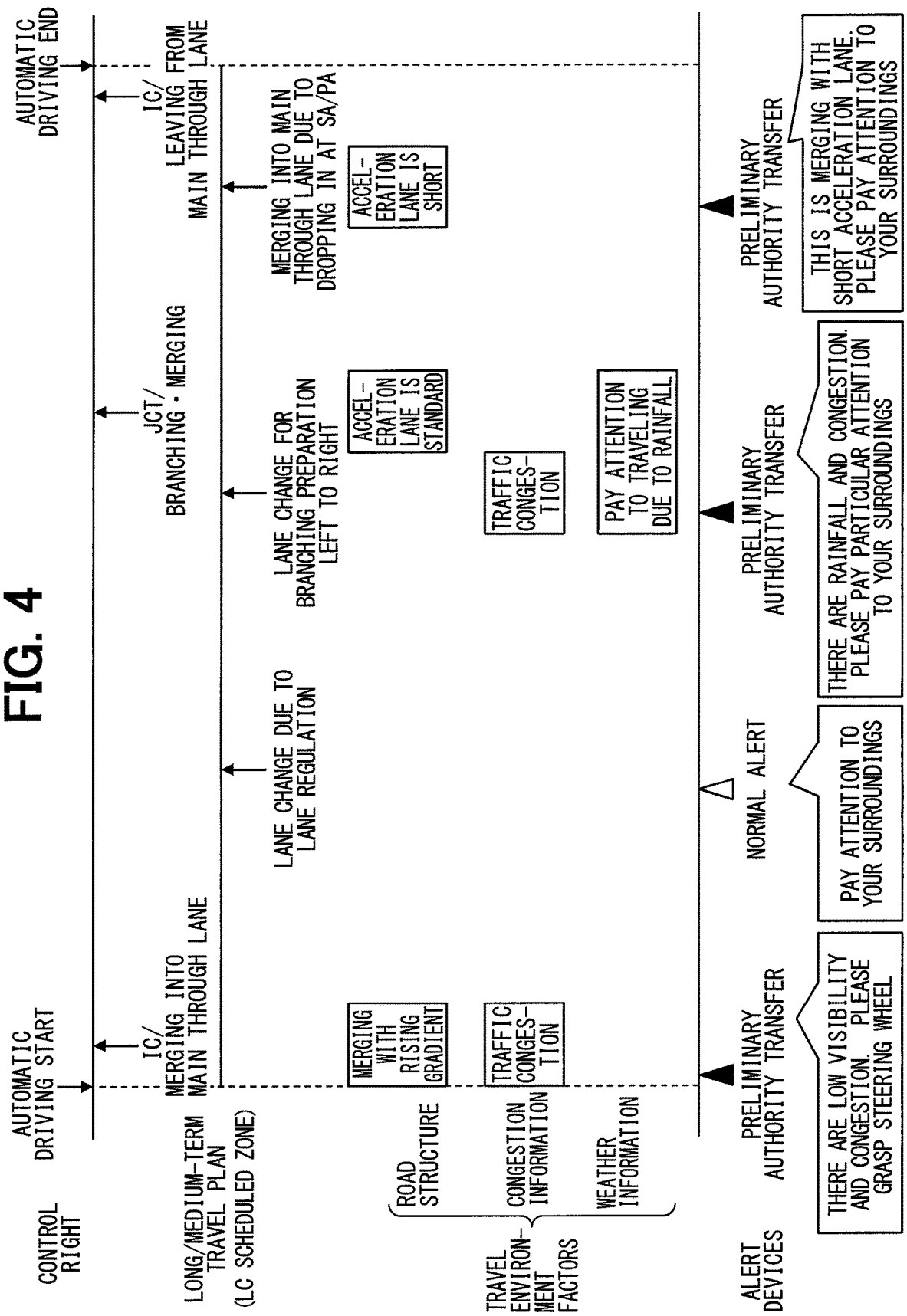
FIG. 4 is a diagram illustrating a concrete example of a scene in which a preliminary authority transfer is performed.

An example of an actual scene in which the preliminary authority transfer is performed by an alert control method based on the above advance notification process will be described with reference to FIG. 4 and also to FIG. 1 on a time-series basis. FIG. 4 illustrates a case in which the automatic driving function is operated from an automatic driving start point which is set between an entrance of an expressway and a main through lane to an automatic driving end point which is set between the main through lane and an exit of the expressway. The illustrated automatic driving is so-called gate-to-gate or lamp-to-lamp automatic driving.

When a long and medium-term travel plan is generated by actuation of the automatic driving function with passage through the automatic driving start point, the zone estimator 31 instantly estimates the occurrence of an LC scheduled zone on the basis of the presence of a merging point in an IC. The determiner group 32 determines that the LC level is "2" on the basis of structure information which indicates a rising gradient of an acceleration lane as the LC scheduled zone and congestion information which indicates congestion in the LC scheduled zone. The preliminary notification device 52 performs a preliminary authority transfer that includes both of the structure information and the congestion information that raise the LC level on the basis of the determination result of the determiner group 32. Specifically, in the preliminary authority transfer, a message such as "THERE ARE LOW VISIBILITY AND CONGESTION. PLEASE GRASP STEERING WHEEL" is virtually displayed by the HUD device 13 and also uttered by the speaker 12.

When there is a lane regulation in the main through lane in the expressway, the zone estimator 31 estimates the occurrence of an LC scheduled zone on the basis of the lane regulation. When all of the structure information, the traffic information, and the weather information have no travel environment factor that raises the LC level, the determiner group 32 determines that the LC level is "0". As a result, for example, a message such as "PLEASE PAY ATTENTION TO YOUR SURROUNDINGS" is virtually displayed by the HUD device 13 as a normal alert.

When there are continuous branching and merging by the JCT, the zone estimator 31 estimates the occurrence of an LC scheduled zone on the basis of the presence of these points. The determiner group 32 sets a section in which a lane change is performed from a left lane (e.g., a driving lane) to a right lane (e.g., a passing lane) for branching preparation as a first LC scheduled zone, and acquires structure information, traffic information, and weather information relating to the first LC scheduled zone. The determiner group 32 determines that the LC level is "2" on the basis of congestion information which indicates congestion in the LC scheduled zone and weather information which indicates rainfall in the LC scheduled zone. The preliminary notification device 52 performs a preliminary authority transfer that includes both of the congestion information and the weather information that raise the LC level on the basis of the determination result of the determiner group 32. Specifically, in the preliminary authority transfer, a message such as "THERE ARE RAINFALL AND CONGESTION. PLEASE PAY PARTICULAR ATTENTION TO YOUR SURROUNDINGS" is virtually displayed by the HUD device 13 and also uttered by the speaker 12.

Then, the determiner group 32 sets a merging point from the JCT into the main through lane as a second LC scheduled zone, and acquires additional structure information, traffic information, and weather information relating to the second LC scheduled zone. The determiner group 32 determines that an additional information presentation by the preliminary authority transfer is unnecessary on the basis of structure information which indicates that an acceleration lane as the second LC scheduled zone has a standard length longer than a predetermined distance and congestion information which indicates that traffic flow is smooth.

When the vehicle A merges into the main through lane after dropping in at a SA or a PA, the zone estimator 31 estimates the occurrence of an LC scheduled zone on the basis of the presence of a merging point from the SA or the PA. The determiner group 32 determines that the LC level is "1" on the basis of structure information which indicates that an acceleration lane is shorter than the predetermined distance. The preliminary notification device 52 performs a preliminary authority transfer that includes the structure information that raises the LC level on the basis of the determination result of the determiner group 32. Specifically, in the preliminary authority transfer, a message such as "THIS IS MERGING WITH SHORT ACCELERATION LANE. PLEASE PAY ATTENTION TO YOUR SURROUNDINGS" is virtually displayed by the HUD device 13.

In the first embodiment described above, when the occurrence of an LC scheduled zone is estimated, the driver is notified in advance of both of the possibility of a transfer of control and the reason of the control transfer by performing a preliminary authority transfer. Such an advance notification based on the situation estimation makes it possible to ensure sufficient time from the performance of the notification to the start of the transfer.

In addition, the reason of the control transfer is notified with a notification mode corresponding to the level of difficulty of lane change control. Accordingly, the driver can initiatively receive the control relating to the driving operation after previously understanding the state of the LC scheduled zone and making advance preparations. Thus, the HCU 20 can reduce a troublesome feeling of the driver such that the driver is forced to change driving under the initiative of a system relating to the automatic driving function.

Further, the driver who has been given sufficient time before the start of a driving change and thus understood the state of the LC scheduled zone in which the driving change is performed can also acquire the control from the automatic driving function on his/her own will after completing advance preparations for the driving change. As described above, override can be easily performed by performing the preliminary authority transfer. According to such override, the driver is further less likely to feel the troublesomeness such that the driver is forced to change driving.

Further, in the first embodiment, structure information of a road such as an acceleration lane to be an LC scheduled zone is used in the determination of the level of difficulty of lane change control. When the acceleration lane to be the LC scheduled zone has a rising gradient and the acceleration lane is short, the lane change control is likely to be difficult. Thus, the HCU 20 can accurately perform the level determination in advance by using the structure information as a travel environment factor. In addition, when the structure information such as low visibility caused by the rising ingredient and the short length of the acceleration lane is presented by the preliminary authority transfer, the driver can receive the control from the automatic driving function after understanding the state of the acceleration lane in detail.

Further, in the first embodiment, congestion information of a road to be an LC scheduled zone is used in the determination of the level of difficulty of lane change control. When the road to be the LC scheduled zone is congested, the lane change control is likely to be difficult. Thus, the HCU 20 can accurately perform the level determination in advance by using the congestion information as a travel environment factor. In addition, when the congestion information is presented to the driver by the preliminary authority transfer, the driver can receive the control from the automatic driving function after understanding the state of the LC scheduled zone in detail.

Further, in the first embodiment, weather information in an LC scheduled zone is used in the determination of the level of difficulty of lane change control. Also when the weather condition in the LC scheduled zone is bad, the lane change control is likely to be difficult. Thus, the HCU 20 can accurately perform the level determination in advance by using the weather information as a travel environment factor. In addition, when the weather information is presented to the driver by the preliminary authority transfer, the driver can receive the control from the automatic driving function after understanding the state of the LC scheduled zone in detail.

Further, in the first embodiment, when a previously defined merging point such as a merging point from an IC, a JCT, and a SA and a PA into a main through lane is present on a route in a long and medium-term travel plan, the zone estimator 31 estimates the occurrence of an LC scheduled zone. According to the estimation of the occurrence of the LC scheduled zone based on map information included in the map data as described above, the HCU 20 can start a preliminary control transfer with sufficient time before a timing when a control transfer is started.

Further, in the first embodiment, when there is a temporary lane regulation on a route in a long and medium-term travel plan, the zone estimator 31 estimates the occurrence of an LC scheduled zone. The HCU 20 can more certainly estimate the occurrence of a situation in which the driver is forced to make a lane change without exception by using temporary traffic regulation information for the estimation of the occurrence of the LC scheduled zone as described above.

In addition, in the preliminary authority transfer of the first embodiment, the driver is notified of any of the travel environment factors including the structure information, the congestion information, and the weather information that raises the LC level as the reason of a control transfer. That is, the driver is notified of all travel environment factors that raise the LC level. Thus, the driver can receive the control after understanding the state of the LC scheduled zone in more detail. In addition, as an estimated degree of difficulty of lane change control becomes higher, a message presented in the preliminary authority transfer becomes longer. Thus, the driver can sensuously grasp the difficulty of lane change control in the LC scheduled zone which the driver is going to encounter and make preparations for a driving change.

Further, in the first embodiment, as the level of difficulty of lane change control becomes higher, the HCU 20 uses more alert devices 10 in the preliminary authority transfer. Thus, when the possibility of a driving change is low, a preliminary authority transfer that is less likely to give the driver a troublesome feeling is performed. On the other hand, the driver is notified of information of a situation that has a particularly high possibility of the occurrence of a driving change in the estimated LC scheduled zone without exception by a plurality of alert devices 10.

In the first embodiment, the HCU 20 corresponds to the "alert control apparatus", and the main processor 21 and the drawing processor 22 correspond to the "processor". Further, the zone estimator 31 corresponds to the "estimator", the determiner group 32 corresponds to the "determiner", and the preliminary notification device 52 corresponds to the "notification device".

Second Embodiment

Figure 5:
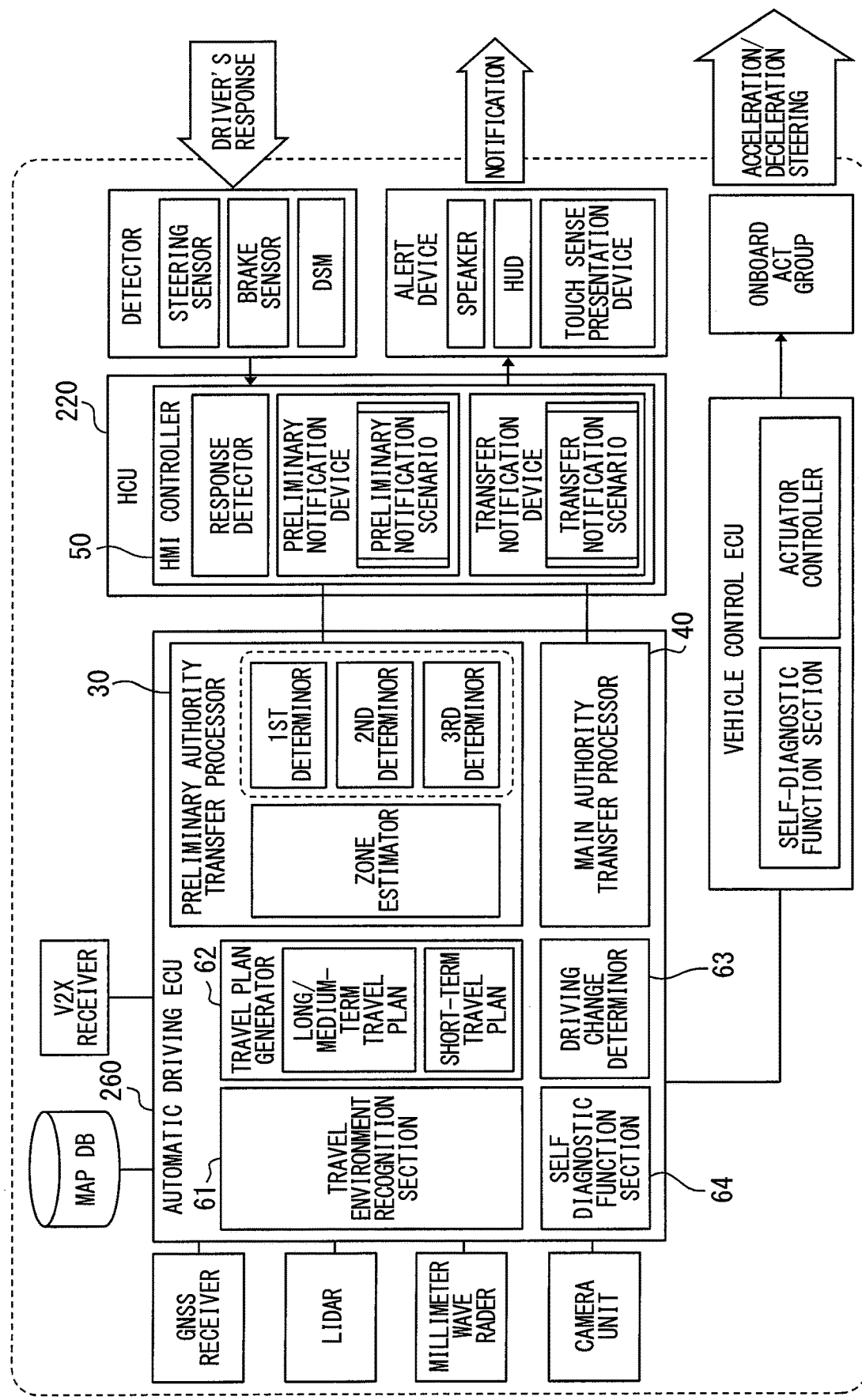
FIG. 5 is a block diagram illustrating the entire configuration of an HCU, an automatic driving ECU, a vehicle control ECU, and the like in a second embodiment.

A second embodiment of the present disclosure illustrated in FIG. 5 is a modification of the first embodiment. An automatic driving ECU 260 of the second embodiment constructs a preliminary authority transfer processor 30 and a main authority transfer processor 40 in addition to functional sections (61 to 64) which are substantially the same as those of the first embodiment by executing an automatic driving program by a processor 61a (refer to FIG. 2). On the other hand, an HCU 220 constructs an HMI controller 50 by executing an alert control program by a main processor 21 and a drawing processor 22 (refer to FIG. 2). That is, the preliminary authority transfer processor 30 and the main authority transfer processor 40 are not constructed in the HCU 220.

Also in the mode in which the preliminary authority transfer processor 30 is constructed in the automatic driving ECU 260 as described above, a preliminary authority transfer based on estimation of the occurrence of an LC scheduled zone can be performed. Thus, the second embodiment also achieves an effect similar to the effect of the first embodiment. The driver can initiatively receive control after previously understanding the state of the LC scheduled zone and making advance preparations. Thus, the automatic driving ECU 260 and the HCU 220 can reduce a troublesome feeling of the driver such that the driver is forced to change driving under the initiative of a system relating to the automatic driving function. In the second embodiment, the automatic driving ECU 260 and the HCU 220 correspond to the "alert control apparatus".

Third Embodiment

Figure 6:
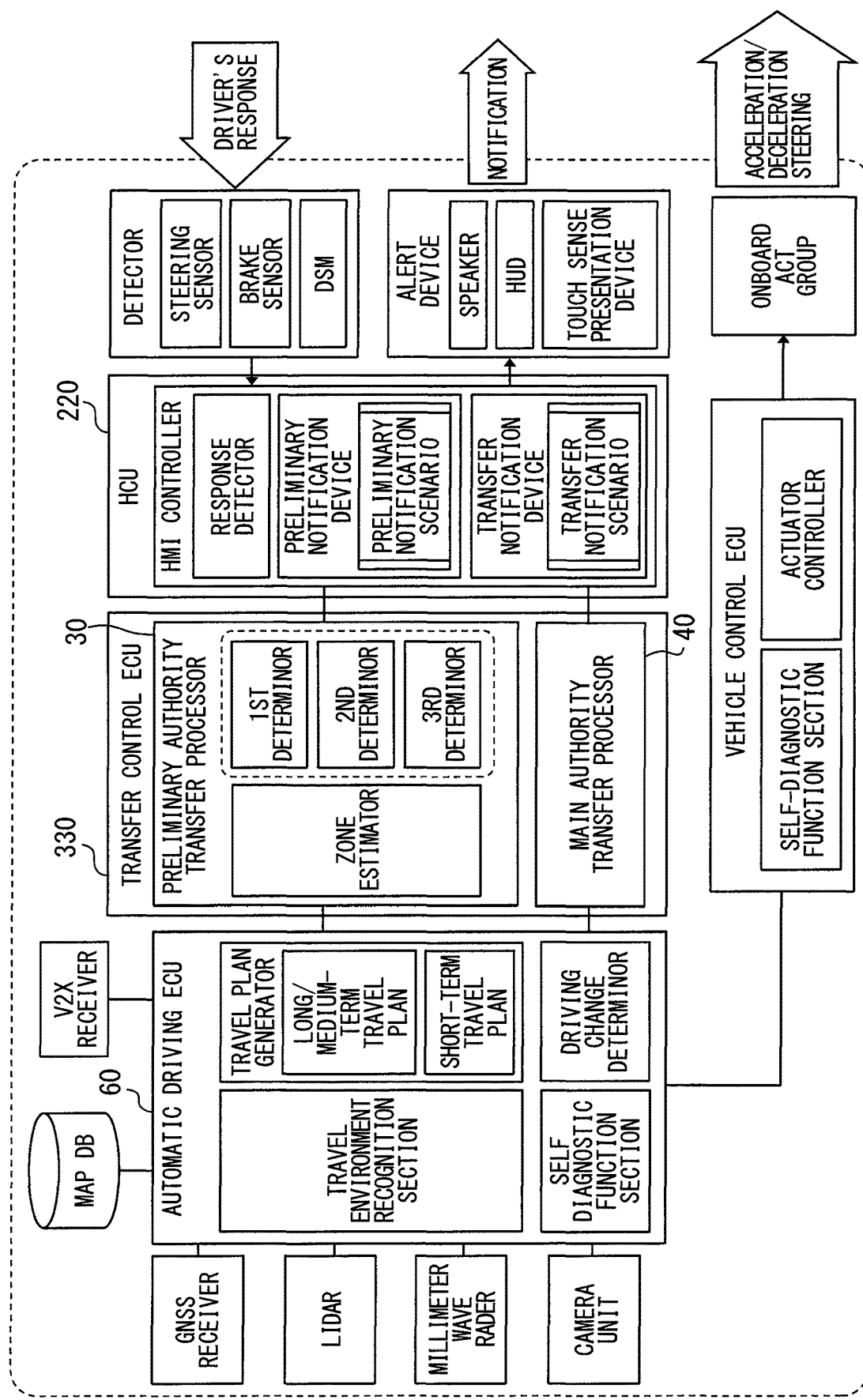
FIG. 6 is a block diagram illustrating the entire configuration of an HCU, a transfer control ECU, an automatic driving ECU, a vehicle control ECU, and the like in a third embodiment.

In a third embodiment of the present disclosure illustrated in FIG. 6 is another modification of the first embodiment. An onboard network of the third embodiment is provided with a transfer control ECU 330 which is electrically connected to an automatic driving ECU 60 and an HCU 220. The transfer control ECU 330 is an electronic control unit mainly composed of a microcomputer which includes a processor, a RAM, a storage medium, and an input/output interface. The transfer control ECU 330 constructs a preliminary authority transfer processor 30 and a main authority transfer processor 40 which are substantially the same as those of the first embodiment by executing a transfer control program by the processor.

The third embodiment in which the preliminary authority transfer processor 30 is constructed in the transfer control ECU 330 as described above also achieves an effect similar to the effect of the first embodiment. The driver can initiatively receive control after previously understanding the state of the LC scheduled zone and making advance preparations. Thus, the transfer control ECU 330 and the HCU 220 can reduce a troublesome feeling of the driver such that the driver is forced to change driving under the initiative of a system relating to the automatic driving function. In the third embodiment, the transfer control ECU 330 and the HCU 220 correspond to the "alert control apparatus".

Other Embodiments

The plurality of embodiments have been described above. However, the present disclosure is not limited to the above embodiments and can be applied to various embodiments and combinations within the range of the gist of the present disclosure.

The zone estimator in the above embodiments estimates the occurrence of an LC scheduled zone on the basis of a merging point or a lane regulation. However, information used in the estimation of the occurrence of an LC scheduled zone by the zone estimator is not limited to the above information. The zone estimator can use various pieces of information relating to a lane change in the estimation of the occurrence of an LC scheduled zone.

Travel environment factors used in each of the determiners are not limited to the structure information, the congestion information, and the weather information as described in the above embodiments. Various travel environment factors relating to the difficulty of lane change control can be used in the determination of the LC level by the determiners. Further, two travel environment factors or four or more travel environment factors may be used in the determination of the LC level in each of the determiners.

Further, each of the determiners of the above embodiments affirms or denies the possibility of a driving change by comparing each previously set threshold with acquired information with regard to the gradient and the distance of an acceleration section, a traveling speed of traffic flow, and the amount of rainfall and the amount of snowfall. However, a determiner constructed by machine learning may determine the possibility of a driving change.

A notification mode of the preliminary authority transfer may be changed according to not only travel environment factors, but also a state of the driver. For example, in a mode capable of acquiring a heart rate or a pulse rate of the driver as driver information, the HCU can detect impatience of the driver. Thus, when the impatience of the driver has been detected, the preliminary notification device can change the contents of a message to contents that calm the driver down in the preliminary authority transfer. Further, the preliminary notification device can change a tone of a voice which performs the preliminary authority transfer to a tone having a calm atmosphere. Further, when a reduction in the awaking level in the driver has been detected on the basis of driver information detected by the detector, the preliminary notification device 52 may perform adjustment for advancing a start timing of the preliminary authority transfer.

The preliminary authority transfer of the above embodiments is started at the timing when a grace period to start the authority transfer becomes a predetermined time. However, the preliminary notification device may start the preliminary authority transfer on the basis of the distance to the LC scheduled zone. Further, the preliminary notification device may not notify the driver of all travel environment factors that raise the LC level. For example, when the LC level is high, the driver may be notified of only one of a plurality of travel environment factors that raise the LC level, the one travel environment factor making lane change control most difficult.

The alert device used in the preliminary authority transfer can be appropriately changed. For example, an ultrasonic speaker may be used to reproduce a voice of the preliminary authority transfer so that only the driver can hear the voice. Further, display of the preliminary authority transfer may be shown on a display surface of a display device that differs from the HUD.

Each of the functions relating to the preliminary authority transfer may be appropriately implemented by various electronic control units mounted on the vehicle as described in the above first to third embodiments. Further, various non-transitive and substantive storage media such as a flash memory and a hard disk can be employed as a configuration that stores a program executed by each of the processors.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An alert control system comprising:
   a human machine interface control unit configured to
      receive a transfer execution signal for transferring driving operation control from an automatic driving electronic control unit, and
      control
         acquisition of operation information input from a driver, and
         information presentation for the driver;
   an alert device configured to notify an occupant of information related to transfer of the driving operation control based on first alert control information or second alert control information output by the human machine interface control unit; and
   a detector configured to
      detect driver information related to a driving state of the driver, and output the driver information to the human machine interface control unit, wherein:

the occupant includes the driver, the human machine interface control unit includes a main authority transfer processor configured to execute a main authority transfer process of notifying the driver of a control transfer for changing a driving operation by an automatic driving function to a driving operation by the driver, a preliminary authority transfer processor configured to execute a process of notifying the driver, in advance, of the control transfer before the control transfer starts, and a human machine interface controller configured to generate the first alert control information based on information acquired from the preliminary authority transfer processor or the second alert control information based on information acquired from the main authority transfer processor, output the first alert control information and the second alert control information to the alert device, extract a driver response to preliminary authority transfer from the driver information, the preliminary authority transfer processor includes an estimator configured to estimate an occurrence of a situation causing the transfer, and a determiner configured to determine a level of a possibility of the control transfer based on an estimated factor, and the human machine interface controller further includes a preliminary notification device configured to generate the first alert control information for notifying the driver in advance of the possibility of the control transfer with a notification mode corresponding to a determined level of the possibility of the control transfer, and output the first alert control information to the notification device, wherein the first alert control information is different from the second alert control information.

2. The alert control system according to claim 1, wherein:

the human machine interface controller further includes a response detector configured to extract the driver response to the preliminary authority transfer from the driver information detected by the detector, and a main notification device configured to generate the second alert control information based on an instruction from the main authority transfer processor.

3. The alert control system according to claim 1, wherein:

the preliminary notification device is configured to notify the occupant of, as a control transfer reason, a factor of the situation causing the control transfer.

4. An alert control system comprising:

a processor that is coupled to a non-transitory computer readable memory storing program instructions and is configured to receive a transfer execution signal for transferring driving operation control from an automatic driving electronic control unit, and control acquisition of operation information input from a driver, and information presentation for the driver;

an alert device configured to notify an occupant of information related to transfer of the driving operation control based on alert control information output by the processor; and a detector configured to detect driver information related to a driving state of the driver, and output the driver information to the processor, wherein:

the occupant includes the driver, the processor is configured to execute a main authority transfer process of notifying the driver of a control transfer for changing a driving operation by an automatic driving function to a driving operation by the driver, execute a process of notifying the driver, in advance, of the control transfer before the control transfer starts, and generate the alert control information based on acquired information, output the alert control information to the alert device, extract a driver response to preliminary authority transfer from the driver information, estimate an occurrence of a situation causing the transfer, determine a level of a possibility of the control transfer based on an estimated factor, and output the alert control information for notifying the driver of the possibility in advance with a notification mode corresponding to a determined level of the possibility.

* * * * *